United States Patent Office 3,166,382
Patented Jan. 19, 1965

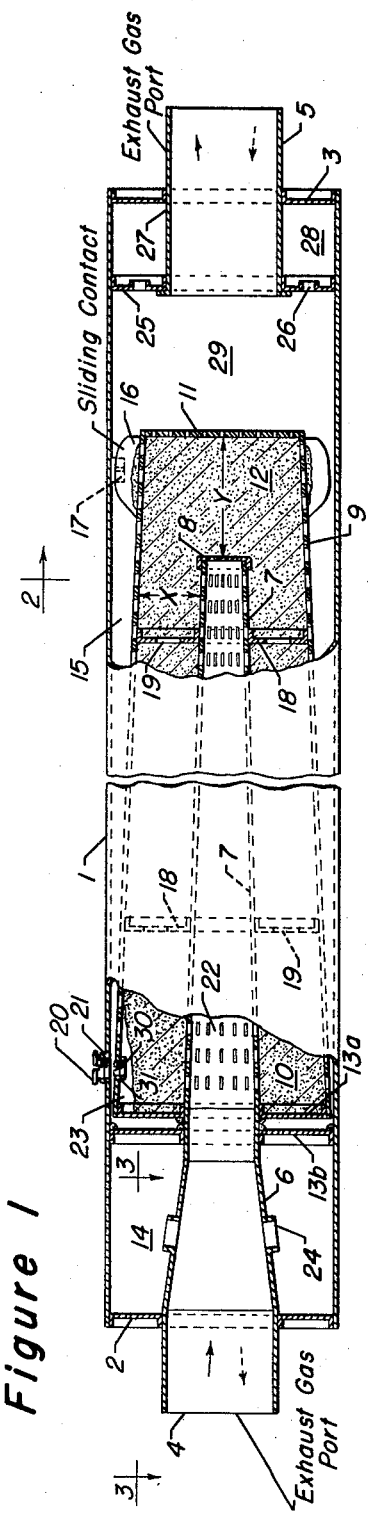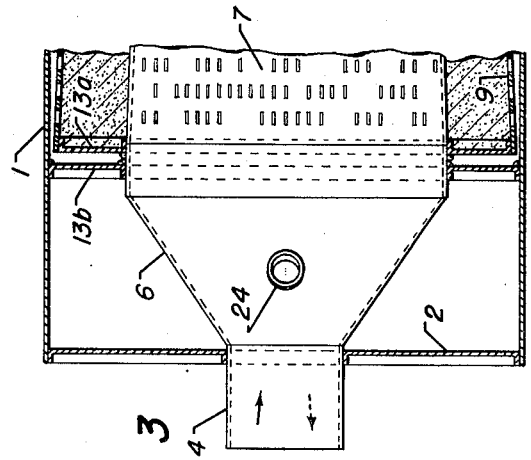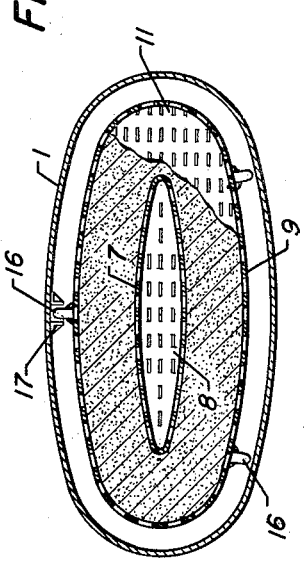
INVENTORS:
Frank V. Purse
Clarence G. Gerhold
ATTORNEYS though they are being used for smog control in stationary exhaust systems as well as for automotive exhausts. Also, for convenience, a majority of the description will refer to the use and application for the catalytic combustion of exhaust gases from internal combustion engines.

3,166,382
CONVERTER-MUFFLER
Frank V. Purse, Northfield, and Clarence G. Gerhold, Palatine, Ill., assignors to Universal Oil Products Company, Des Plaines, Ill., a corporation of Delaware
Filed Sept. 7, 1962, Ser. No. 222,081
3 Claims. (Cl. 23—288)

The present invention relates to an improved form of converter-muffler containing a frustro-conical or "thimble-shaped" fixed bed of subdivided contact material for the treatment of engine exhaust gases. More specifically, the improved design provides for an optimum catalytic conversion and purification of an exhaust gas stream by reason of effecting a controlled stream flow and by minimizing the effects of unequal expansion between the catalyst bed and the metal catalyst retaining section.

The desirability of removing or converting the noxious compounds of vehicular exhaust gases has been generally well established as a means for overcoming smog in many geographical areas. In a catalytic operation, the hot gases issuing from the motor exhaust manifold are mixed with a quantity of secondary or combustion air and the resulting mixture passed through a catalyst bed maintained within a conversion zone so as to effect a more or less complete oxidation of carbon monoxide and unburned hydrocarbons present in the exhaust stream. The use of a catalytic method and apparatus also provides for the initiation of the oxidation reaction at lower temperatures than might otherwise be possible and effectively eliminates the need for igniting means which are generally used with most types of "afterburners" or other apparatus which depend strictly upon thermal conditions.

A preferred form of exhaust gas conversion apparatus embodies a design and construction which provides for the internal placement or positioning of a catalyst bed such that it may be utilized in an efficient manner and to maximum degree. It is not intended to limit the present invention to the use of any one type of catalyst since there are improved catalyst compositions available which will retain their catalytic efficiency for long periods of operation. The catalyst is used in particle form, such as small spheres, cylinders and/or pellets, and is disposed in a suitable catalyst retaining section providing for uniform flow therethrough.

It is thus one object of the present invention to provide a converter which is adapted to accommodate an auto exhaust gas stream and control the flow therethrough for an efficient catalytic contact.

It is a further object of the present invention to provide for a thimble form of bed or modified annular-shaped catalyst bed which permits some degree of longitudinal flow as well as radial flow.

A still further object of the improved design is to obtain a tapering or non-level catalyst surface in the principal portion of the bed which minimizes catalyst settlement effects.

In a specific embodiment, the catalytic converter-muffler apparatus for treating an engine exhaust gas stream comprises in combination, an elongated cylindrical form of outer housing having an exhaust gas port at each end thereof, interior transverse partitioning means spaced a short distance from one end of the housing and having a central gas passageway therethrough, a gas conducting member between the adjacent gas port in the end of the housing to said gas passageway of the partitioning means, an inner perforate tubular gas conducting member extending from said gas passageway axially through a major portion of the length of said housing, the tubular member tapering and reducing in cross section from the partitioning means to a smaller end having a transverse perforate end section, an outer perforate catalyst retaining member spaced substantially symmetrically around the inner perforate member, said outer member extending longitudinally from said transverse partitioning means for a distance greater than the longitudinal extent of said inner member and having a perforate end section spaced from the perforate end section of said inner member, catalyst particles retained in said outer tapering member uniformly around said inner member and within the spaced distance between the perforate end sections of the perforate members, the outer tapering perforate member providing with the inside of said outer housing a variable cross sectional area annular-form gas manifold section longitudinally inside of said outer housing whereby an exhaust gas stream may pass radially through the catalyst particles between the perforate tubular members as well as in part longitudinally through the catalyst between said perforate end sections thereof as such stream passes from one end of said apparatus to the other end thereof.

Radial flow through an annular form of bed is of particular advantage in fluid-solids contacting in that it obtains a substantially uniform flow through a uniform depth of bed. However, in connection with a straight cylindrically shaped annular catalyst bed there may be a long section of catalyst settlement such that there is a tendency for a fairly large portion of the gas or fluid stream to pass through a relatively thin settled portion of the annular shaped catalyst bed and result in an inefficient conversion operation. It may be noted that a preferred construction is provided by the sloping or tapering catalyst retaining section of the present invention where there is a small settled portion of the bed in an upper segment of a conical shape and a minimization of the area through which gas bypassing may occur.

Still another advantageous feature of the present improved design is the provision of a transverse or end portion of catalyst in a thimble-shaped catalyst retaining section between the inner and outer perforate members so that a zone of low space velocity is provided to effect initial conversion or "ignition" of the exhaust gas stream in the catalyst bed.

One of the handicaps encountered in the utilization of many catalytic converter designs for effecting the catalytic oxidation of automotive exhaust gases is the necessity for achieving a low ignition temperature. In other words, when an automobile is started and used from a cold start, then for a period of from two to perhaps ten minutes, depending upon the manner of operating the automobile, the catalyst bed may remain relatively cool and be unable to burn the residual combustible components effectively within the converter, thus allowing such combustibles to escape through the tailpipe to the atmosphere. It has been determined, however, even at relatively low temperatures, in the 100° to 300° F. range, that some combustion occurs at the catalyst surface, but that the rate of flow of the cold gases is so rapid that the relatively small amount of heat of combustion liberated per unit of time is dissipated in the exhaust gas stream, thus minimizing heat storage by the catalyst particles and any temperature build-up in the bed. Only when the rate of evolution of heat by combustion exceeds the rate at which heat is carried off is it possible for the temperature of the catalyst bed to be raised, resulting in what is called "ignition," or combustion at a self-sustaining rate. Thus, a preferred design of the converter provides a greater distance between the spaced perforate end portions of the catalyst retaining section than exists as a radial distance between the spaced members along their cylinder-like walls, so as to permit a greater depth of catalyst in the longitudinal direction of flow than exists for radial flow of the exhaust gas stream, and in turn provide a zone for rapid ignition and catalytic conversion of the exhaust gas stream. The heat from the end ignition zone will, of course, spread longitudinally through the annular shaped portion of the catalyst bed and bring about catalytic conversion throughout the entire bed.

It is to be understood that the terminology "cylindrical" or "annular-shape," as used herein, embodies both circular and oval cross sections with respect to a tubular member or a zone between spaced tubular members, inasmuch as the present improved form of construction may apply to either the cricular or oval form of housing and interior chambers. The exterior appearance of the improved converter-muffler will thus be similar to that of the present day cylindrical or oval shaped mufflers and resonators in use with automobiles and trucks.

The design and construction of the improved converter, as well as the advantageous features in connection therewith, may be better set forth and explained by reference to the accompanying diagrammatic drawing and the following description thereof.

FIGURE 1 of the drawing is a sectional elevational view through one embodiment of an oval-shaped converter-muffler adapted to retain a catalyst bed therein.

FIGURE 2 of the drawing is a cross sectional view through the apparatus, as indicated by the line 2—2 in FIGURE 1.

FIGURE 3 of the drawing is a partial sectional plan view showing a tapering gas passageway and resonating chamber at one end of the converter apparatus, as indicated by the line 3—3 in FIGURE 1.

Referring now to the drawing, there is shown an oval shaped outer housing or shell 1 having end plates 2 and 3 which in turn have conduit or pipe sections providing exhaust gas ports 4 and 5 adapted to handle the exhaust gas stream flow from an engine exhaust system. At one end of the apparatus, the port conduit 4 connects through a tapering gas conducting transition section 6, as best shown in FIGURES 1 and 3, to a tapering inner perforate tubular member 7 such that an exhaust gas stream may be introduced to the unit by way of port 4, transition piece 6 and perforate member 7, or alternatively, whereby a treated gas stream may be collected on the interior of perforate member 7 and discharged by way of conduit sections 6 and 4. The inner perforate tubular member 7 tapers and varies in cross sectional area as it extends longitudinally for a major portion of the interior of the housing 1 to ultimately terminate with a perforate end section 8. An outer tapering perforate catalyst retaining member 9 is positioned substantially symmetrically or concentrically around the inner member 7 and likewise extends from a transverse end plate 13a in a tapering manner longitudinally for a major portion of the interior length of housing 1 to provide a longitudinal annular-form catalyst retaining section 10. The outer perforate member 9, however, extends for a greater distance than the inner member 7 and terminates with a perforate end section 11 which is spaced longitudinally from the perforate end plate 8 for a distance "Y." Thus, catalyst particles are retained within the annular section 10 as well as in an end section 12 to provide a thimble-shaped catalyst bed around the inner perforate member 7 on the interior of housing 1. The transverse end plate 13a is spaced closely adjacent a fixed transverse partitioning member 13b which is connected between the end of tubular member 7 and the inner wall of the housing 1. End plate 13a is in sealed contact with each of the perforate members 7 and 9 so that it serves to provide an end wall member for the catalyst retaining section 10, however, it is not connected with partition 13b or housing 1 in order that there may be desirable flexibility and expansive movement possible at its outer periphery. Plate 13b is constructed to have a sealed connection with the housing and the end of member 7 in order to define an enclosed gas tight resonating chamber 14 in the space extending to the end plate 2 and around the tapering conduit section 6. In addition, the transverse partition 13b provides a gas seal member such that there is no exhaust gas passage from the end resonating section 14 and the catalyst section 10, or with the annular gas manifold zone 15 resulting between the exterior of the tapering outer perforate member 9 and the inside of the outer housing wall 1.

The fixed connection of tapering section 6 and the transverse plate 13b with the outer housing results in the longitudinal expansion, under increased temperature conditions, of the interior perforate plates 7 and 9 away from the position of member 13b. In other words, the interior end portion of the perforate catalyst retaining member 9, as well as the plate 11, remain unconnected with the inside of housing wall 1 so that there may be a sliding movement thereof with respect to the housing. However, in order to retain the free end of the catalyst retaining member 9 and the catalyst bed in a proper position within the housing, suitable spacers or shoe members 16, as shown in FIGURES 1 and 2, provide for centering the catalyst retaining section in the housing and at the same time permitting a sliding contact with the inside surface of the outer housing 1. Such spacer members 16 are preferably relatively narrow rib-like pieces welded or otherwise attached to the exterior end portion of the perforate tubular member 9 so that gas flow to or from the outer manifold section 15 will not be interfered with. Where it is deemed desirable, one or more pairs of short guide clips or angle members 17 may be attached to the inside wall of the outer housing 1, in a manner to straddle one or more of the spacer members 16, so that lateral movement is precluded between the inner catalyst retaining section and the housing 1.

In order to obtain strength and rigidity for the tubular inner member 7 and the outer tubular member 9, a plurality of spaced stiffener plates or diaphragms 18 are positioned transversely between the two tubular members in a fixed manner and at predetermined longitudinal spacings. Also, to insure continuity and heat travel longitudinally through the thimble-shaped catalyst bed in sections 10 and 12, as well as to permit the filling of the catalyst retaining sections with catalyst particles from a central fill-plug, there are provided spaced openings 19 in the plurality of spaced plates 18. The fill-plug arrangement, indicated diagrammatically in the drawing, has an outer threaded plug 20 as being removably positioned in an interiorly threaded bushing or shoulder member 21 which passes through the wall of outer housing 1 in alignment with an inner threaded plug 30 removably positioned in a bushing or shoulder portion 31 in the perforate plate 9. Thus, catalyst particles may be added or removed and replaced within the catalyst retaining sections 10 and 12 after assembly of the converter-muffler apparatus.

It should be noted that the present improved design incorporates tapering manifold sections for the distribution and collection of the exhaust gas stream flow within the interior of the apparatus such that the effects of the velocity head of the exhaust stream is minimized. The reduction in the cross sectional area of the inlet manifold of the gas flow together with the reverse situation in the gas collection section such that there is an increased cross sectional area in the direction of gas flow provides for a substantially uniform flow or "driving force" across the catalyst bed at any one point. For example, where the interior space 22 within the inner tapering tubular member 7 serves as an inlet manifold to the catalyst bed and the exterior tapering annular section 15 between the outer tubular member 9 and the housing 1 serves as a gas collection zone, there is the desired reducing area gas inlet section and the desired increasing cross sectional area outlet manifold. The same conditions are obtained where the exhaust gas flow is in the opposite direction, with section 15 serving as a gas distributing manifold and the inner zone 22 serving as a gas collection section.

An additional feature that is obtained by the use of a tapering thimble-shaped catalyst retaining bed is the confinement of the void or voids which result from catalyst settlement in the apparatus. By reason of the difference in differential expansion between the perforated metal catalyst retaining members 7 and 9, which have a large coefficient of expansion as compared with the catalyst particles in sections 10 and 12, as well as by reason of the gradual compaction of the catalyst particles from the jarring effects received by the apparatus from a moving vehicle, there will necessarily result a small space or void area 23 within the uppermost portion of the tapering catalyst retaining section 10. However, such small void area 23 will have little or no effect upon the efficient operation of the unit inasmuch as the exhaust gas flow through such zone will be minimal, particularly where the velocity head of the exhaust gas flow is directed toward the small end section 8 and radially outwardly through the catalyst bed. Where desired, the fill-plugs 20 and 30 may be positioned, respectively, through the housing and the outer perforate member 9 and into the catalyst retaining section 10 along the upper portion thereof, considering the converter-muffler apparatus to be in a normally horizontal position when in use with auto vehicles as shown in FIGURE 1 of the drawing. On the other hand, where a converter-muffler apparatus of the present design is to be utilized in a vertical position, which may occur in connection with various truck or stationary engine installations, the small end zone 12 of the catalyst thimble may be positioned at the top such that any settlement will be between perforate end plates 11 and 8. A small settlement away from end plate 11 will have little or no effect upon the flow of the exhaust gas stream with no possibility whatsoever of bypassing the bed, particularly when excess capacity is utilized at the end of the catalyst thimble.

A preferred design of the apparatus provides a spacing of the inner and outer perforate tubular members 7 and 9, as well as the spacing between end plates 8 and 11, such that the longitudinal dimension "Y" between the latter members is slightly greater than the radial dimension "X" between members 7 and 9. The special design provides a catalyst retaining zone which is directly in the path of the longitudinal flow of the exhaust gas stream that will provide a lower "space velocity" (which may be defined as the ratio of the quantity of exhaust gas per unit of time with respect to the quantity of catalyst present within a given volumetric area), as well as a lower linear velocity to permit a zone where "ignition" may take place. As pointed out hereinbefore, it is particularly desirable to insure a catalytic converter design that will permit the initiation of the catalytic oxidation of the combustible components in the exhaust gas stream at a relatively low ignition temperature so that the bed as a whole will begin to operate within as short a time as possible after the startup of an engine. In the present thimble design, the velocity head effect of the exhaust gas flow will be minimized by having the catalyst bed relatively thick at dimension "Y" within the end retaining section 12. Such dimension may be of the order of ¾ inch to 1 inch more than the dimension "X" in the radial flow direction. By actually reducing the space velocity of the gas stream through the end section it is possible to have a zone which will initiate the catalytic oxidation and cause a high temperature front to move longitudinally through the catalyst retaining section 10, in the same manner that a flame front may move longitudinally in a confined combustion zone being charged with an inflammable material, after ignition at one end of the zone. In an actual test operation utilizing catalyst particles of approximately 1/16-inch average diameter and containing less than 1% platinum by weight as a catalytic agent, it was found that the inlet temperature of an exhaust gas stream to a conversion zone containing such catalyst particles could be reduced approximately 90° F., i.e., from 670° to 580° F., and still initiate catalytic combustion, when the space velocity through the unit was reduced by approximately 25% from that required for the ignition of the high velocity flow.

Still another advantageous feature of a preferred embodiment of the present invention is the placement of resonating chambers at each end of the housing. Such chambers are provided by placing openings from the exhaust gas passageway means in a manner to communicate with trapped sections or "dead-ended" zones or chamber-like sections which have no outlet openings therefrom. In other words, in the zone 14 between the end plate 2 and the transverse partitioning member 13 there may be inlet openings 24 thereto which permit exhaust gas to flow into the zone surrounding the tapering transition conduit section 6 and provide a resulting hot gas filled zone at the end of the catalyst retaining section 10. The gas filled zone 14, in addition to providing a resonating or "echo" chamber for a desired muffling effect of the exhaust gas stream, serves as a heated insulating chamber between the end of the housing 1 and the end of the interiorly positioned catalyst bed. At the opposing end of the apparatus, spaced from the end plate 3 and the perforate end section 11, is a transverse partitioning member 25, which in turn is provided with openings 26 to form a resonating zone 28. The partition member 25 connects between the inside of housing 1 and the end of an interior portion of conduit 27 that in turn connects with the exhaust gas port 5. There is thus provided a resulting chamber 28 which is entirely closed within the interior end portion of the housing 1 except for the gas passageway openings 26 which permit hot gases from the exhaust stream to flow thereto. Here again, the space or zone 28 serves as a resonating chamber as well as an end insulating zone which precludes loss of heat from the interiorly positioned catalyst bed. Transverse plate 25 is, of course, positioned sufficiently away from the perforate member 11 of the catalyst retaining section 12 so that there is an adequate area or passageway 29 for the longitudinal flow of the exhaust gas stream through the apparatus.

In the operation of the unit the exhaust gas flow may pass in either direction with respect to longitudinal flow through the converter-muffler apparatus. In other words, flow may enter port 4, the transition section 6 and the enlarged tubular member 7, pass radially through catalyst retaining sections to the manifold section 15, then through the end zone 29 and outwardly through conduit section 27 and port 5. In this type of flow there is a maximum retention of the heat of the exhaust gas stream within the apparatus and a maximum buildup of temperature within the catalyst bed in retaining sections 10 and 12. On the other hand, the exhaust gas flow may be in the other direction, entering port 5, conduit section 27, distributing zones 29 and 15, passing radially inwardly from the latter and into the inner manifold section 22, thence through the tapering section 6 to port 4. When flow is in this direction, it may be noted that there is a direct impingement of the hot exhaust stream from the conduit section 27 against the end perforate member 11 and the catalyst retained in end section 12 so that here again the latter section provides a point of rapid ignition and catalytic oxidation of the combustibles in the exhaust gas stream such that the temperature front through the catalyst bed may move longitudinally from the end zone 12 through the remaining thimble-portion of the catalyst bed. However, with the flow in either direction, the perforate tubular members forming the catalyst section on the interior of the unit are free to expand longitudinally from the transverse partitioning means 13, by virtue of the sliding contact permitted between the shoe members 16 and the interior of the housing 1. Buckling or rupture of the interior plate members is substantially precluded, even though there may be innumerable expansions and contractions of the inner metal members, with respect to the cooler outer housing. Although not shown in the drawings, it is within the scope of the present design to provide for the covering of the outer cylindrical or oval housing 1 and end members 2 and 3 with a suitable insulating material, such as mineral wool or the like, in order to maintain a maximum amount of the heat of exhaust gas stream and the exothermic heat of oxidation taking place within the catalyst section. Such insulating material may in turn be encased within a suitable weatherproof protective casing which has the general shape or configuration of the outer housing 1.

It may also be understood that various minor modifications in the design and/or location of various portions of the apparatus may be made within the scope of the present invention. As, for example, there may be variations in the shape and spacing of partitioning members from that indicated in the drawing, or in the location and design of the fill-plug arrangement to the interior catalyst retaining section, as well as with respect to the sizing and positioning of various openings for the gas flow through various partitioning and stiffening members.

The perforations in the inner end members of the catalyst retaining shell and the tapering tubular members will, of course, be sized in relation to the size of the catalyst particles which are to be maintained within the apparatus. The physical shape of the catalyst particles may be such that they are in the form of spheres, cylinders or pellets, typically having a dimension of $\frac{1}{16}$-inch to about $\frac{1}{4}$-inch, although particles of larger or smaller dimensions may be employed, where desirable. Mixed sizes of catalysts may well be utilized. However, in loading the catalyst, care should be taken to be sure that the catalyst particles are uniformly packed in all portions of the bed to provide substantially uniform resistance to the gas flow therethrough. As indicated hereinbefore, it is not intended to limit the present invention to any one type of catalyst, but suitable oxidation catalysts include the metals of groups I, V, VI, and VIII of the periodic table particularly copper, silver, vanadium, chromium, iron, cobalt, nickel and platinum. These components may be used singly, in combination with two or more, or may be composited with an inorganic refractory oxide such as alumina, silica-alumina, silica-alumina-zirconia, silica-thoria, silica-boria, and the like.

We claim as our invention:

1. A catalytic converter-muffler apparatus for treating an engine exhaust gas stream comprising in combination, an elongated outer housing having an exhaust gas port at each end thereof, an inner tapering perforate tubular gas conducting member extending from a gas port at one end of said housing axially through a major portion of the length of said housing, said tubular member tapering and reducing in cross section from the end of said housing to a smaller end having a transverse perforate end section, an outer tapering perforate particle retaining member positioned substantially symmetrically around and spaced from said inner perforate member, said outer member extending longitudinally from said end of said housing for a distance greater than the longitudinal extent of said inner member and having an outer perforate end section spaced from said perforate end section of said inner member, subdivided particles retained in said outer tapering member uniformly around said inner member and within the spaced distance between said perforate end sections of said perforate members, said outer tapering perforate member providing with the inside of said outer housing a variable cross sectional area annular-form gas manifold section longitudinally inside of said outer housing whereby an exhaust gas stream may pass radially through said particles between said perforate tubular members as well as in part longitudinally through the particles between said perforate end sections thereof as such stream passes from one end of said apparatus to the other end thereof.

2. The apparatus of claim 1 further characterized in that the spaced distance between said perforate end sections of said perforate tubular members is greater than the spaced distance radially between said inner and outer perforate members.

3. A catalytic converter-muffler apparatus for treating an engine exhaust gas stream comprising in combination, an elongated outer housing having an exhaust gas port at each end thereof, interior transverse partitioning means spaced a short distance from one end of said housing and having a central gas passageway therethrough, a gas conducting member connecting between the adjacent gas port in the end of said housing and said gas passageway of said partitioning means, an inner tapering perforate tubular member extending from said gas conducting member and said partitioning means axially through a major portion of the length of said housing, said tubular member tapering and reducing in cross section from said partitioning means to a smaller end having a transverse perforate end section, an outer tapering perforate particle retaining member positioned substantially symmetrically around and spaced from said inner perforate member, said outer member extending longitudinally from said transverse partitioning means for a distance greater than the longitudinal extent of said inner perforate member and having a perforate end section spaced from said perforate end section of said inner member, subdivided particles retained in said outer tapering member uniformly around said inner perforate member and within the spaced distance between said perforate end sections of said perforate members, said outer tapering perforate member also spaced from said outer housing and providing with the inside of said outer housing a variable cross sectional area open-ended annular-form gas manifold section extending around said outer perforate member whereby an exhaust gas stream may pass radially through said particles between said perforate tubular members as well as in part longitudinally through the particles between said perforate end sections thereof as such stream passes from one end of said apparatus to the other end thereof.

References Cited in the file of this patent

UNITED STATES PATENTS

| | | |
|---|---|---|
| 2,131,001 | Prochnow | Sept. 20, 1938 |
| 2,185,584 | Boyce | Jan. 2, 1940 |
| 2,329,847 | McCausland | Sept. 21, 1943 |
| 2,614,033 | Cornell et al. | Oct. 14, 1952 |
| 2,635,989 | Bonner | Apr. 21, 1953 |
| 2,639,224 | McAfee | May 19, 1953 |
| 2,928,492 | Nelson | Mar. 15, 1960 |
| 2,956,865 | Williams | Oct. 18, 1960 |
| 3,041,149 | Houdry | June 26, 1962 |